United States Patent
Christopher

(10) Patent No.: US 7,152,402 B2
(45) Date of Patent: Dec. 26, 2006

(54) HYDRAULIC VEHICLE SEAT ADJUSTMENT CONTROL VALVE ASSEMBLY

(75) Inventor: Hugh H. Christopher, West Bridgford (GB)

(73) Assignee: Lear Corporation, Southfield, MI (US)

( * ) Notice: Subject to any disclaimer, the term of this patent is extended or adjusted under 35 U.S.C. 154(b) by 107 days.

(21) Appl. No.: 10/971,902

(22) Filed: Oct. 22, 2004

(65) Prior Publication Data
US 2005/0115233 A1 Jun. 2, 2005

(30) Foreign Application Priority Data
Oct. 22, 2003 (GB) .................. 0324552.9

(51) Int. Cl.
*F04B 9/00* (2006.01)
*B60N 2/04* (2006.01)

(52) U.S. Cl. .............. 60/434; 297/354.12; 297/362.13; 137/551

(58) Field of Classification Search .................. 60/433, 60/434; 297/354.12, 362.13; 91/1; 137/551, 137/553, 554, 556
See application file for complete search history.

(56) References Cited

U.S. PATENT DOCUMENTS

| | | | | |
|---|---|---|---|---|
| 2,640,465 A | * | 6/1953 | McLeod | .......................... 92/14 |
| 2,660,223 A | * | 11/1953 | Appleton | .................. 297/344.1 |
| 2,805,702 A | * | 9/1957 | Appleton | .................... 297/233 |
| 3,712,603 A | * | 1/1973 | Hickinbotham | ............. 267/131 |
| 3,760,911 A | | 9/1973 | Porter et al. | |
| 3,777,617 A | | 12/1973 | Okiyama | |
| 3,860,098 A | | 1/1975 | Porter et al. | |
| 3,927,911 A | | 12/1975 | Rosquist | |
| 4,012,175 A | * | 3/1977 | Simonds, Jr. | ............... 417/316 |
| 4,276,903 A | * | 7/1981 | Spohr | ........................ 137/554 |
| 4,550,750 A | | 11/1985 | Korth | |
| 4,720,143 A | | 1/1988 | Schwartz et al. | |
| 5,435,625 A | | 7/1995 | Weber | |
| 5,743,591 A | | 4/1998 | Tame | |
| 6,015,130 A | | 1/2000 | Kigel | |
| 6,047,797 A | | 4/2000 | Popjoy | |
| 6,059,253 A | | 5/2000 | Koutsky et al. | |
| 6,142,564 A | | 11/2000 | Pajela et al. | |
| 6,161,633 A | | 12/2000 | Broom | |
| 6,382,491 B1 | | 5/2002 | Hauser et al. | |
| 6,789,570 B1 | * | 9/2004 | Beyrak et al. | ............... 137/554 |
| 7,014,275 B1 | * | 3/2006 | Ring | ........................... 303/13 |

(Continued)

FOREIGN PATENT DOCUMENTS

DE 202 15 969 2/2003

(Continued)

*Primary Examiner*—Thomas E. Lazo
(74) *Attorney, Agent, or Firm*—MacMillan, Sobanski & Todd, LLC

(57) ABSTRACT

A control valve, and a control module including such a control valve, for selectively controlling a flow of pressurised hydraulic fluid from a pump in a hydraulically powered vehicle seat adjustment system. The control valve including a duct for pressurised fluid delivered from the pump, and a moveable valve member which selectively closes off the duct. The control valve also includes an integral set of contacts which are arranged to activate the pump to provide a supply of pressurised hydraulic fluid to the duct when the valve member is in the second operative position in which hydraulic fluid is permitted to flow though the duct. The control valves are preferably mounted within the control module which defines an internal chamber forming a reservoir of the hydraulically powered vehicle seat adjustment system. The control module is mounted upon a side valance of the seat as a single integrated unit.

19 Claims, 4 Drawing Sheets

U.S. PATENT DOCUMENTS

| | | |
|---|---|---|
| 2002/0130542 A1 | 9/2002 | Ellerich et al. |
| 2003/0209929 A1 | 11/2003 | Muin et al. |

FOREIGN PATENT DOCUMENTS

| | | |
|---|---|---|
| DE | 101 52 561 | 5/2003 |
| EP | 0 316 675 | 5/1989 |
| EP | 0 878 348 | 11/1998 |
| EP | 1 077 153 | 2/2001 |
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

HYDRAULIC VEHICLE SEAT ADJUSTMENT CONTROL VALVE ASSEMBLY

CROSS REFERENCE TO RELATED APPLICATIONS

This application claims priority to Great Britain Patent Application No. 0324552.9 filed Oct. 22, 2003, the disclosures of which are incorporated herein by reference.

BACKGROUND OF THE INVENTION

The present invention relates to a vehicle seats, in particular to hydraulic or fluid powered adjustable automotive vehicle seats.

In order to comfortably accommodate various sizes and shapes of occupants vehicle seats are generally provided with various adjustment mechanisms to adjust the position of the seat within the vehicle and/or move various movable portions of the seat.

Typically vehicle seats are provided with fore and aft adjustment, and the seat back is pivotally mounted to a seat bottom cushion such that the angle of the seat back to the bottom cushion of the seat can be adjusted. Other adjustment and adjustment mechanisms may also be provided to for example adjust the height of the vehicle seat, angle and tilt of the seat bottom cushion, position of the headrest, and/or the lumber support etc.

The seat adjustment mechanisms may be manually operable and mechanically locked in place, or increasingly some or all may be power operated. Conventionally such power operated adjustment mechanisms comprise separate electric motors mounted within the seat and driving each adjustment mechanism through suitable gearing. The individual motors are controlled via switches operable by the seat occupant.

Alternatively hydraulic or fluid powered seat adjustment mechanisms have been proposed instead of the electric powered systems. Indeed the earliest of such proposals date back a number of years. A distinction should however be drawn between hydraulic or fluid powered adjustment systems, and the more basic and simple and hydraulic or pneumatic damper arrangements.

In hydraulic or fluid powered seat adjustment arrangements pressurised fluid, provided from a pump, is supplied via a control valve arrangement to piston/cylinder actuators. These actuators move and adjust the position of the seat or portions of the seat to be adjusted. An example of a hydraulic powered seat adjustment system incorporating a hydraulic actuator is described in U.S. Pat. No. 5,435,625.

Such powered hydraulic seat adjustment systems offer smooth and almost infinitely variable adjustment and locking of the position of the seat. This can be contrasted with the incremental locking provided by conventional mechanical arrangements. Hydraulically powered arrangements also offer the prospect of extremely quiet, near silent, operation, without the noisy mechanical gearing. In spite of these, and other, advantages hydraulic actuators for vehicle seat adjustment have not been adopted for widespread automotive use.

Specifically a major problem with such hydraulic systems is the cost and perceived complexity of the systems. In particular the complexity of the control valve, control arrangements, and ancillary elements in previous systems has also made the systems impractical for automotive adoption, and/or rendered the previously proposed arrangements unsuitable for practical use.

It is therefore desirable to provide an improved hydraulically powered automotive vehicle seat adjustment system, and in particular a hydraulic vehicle seat adjustment control valve arrangement for such a system, which addresses the above described problems and/or which offers improvements generally.

SUMMARY OF THE INVENTION

According to the present invention there is provided a control valve, and a control module including a control valve, for a hydraulically powered vehicle seat adjustment system as described in the accompanying claims.

In an aspect of an embodiment of the invention there is provided a control valve for selectively controlling a flow of pressurised hydraulic fluid from an electrically driven pump in a hydraulically powered vehicle seat adjustment system. The control valve comprises a main body within which at least one duct is defined for the passage of pressurised fluid delivered from the pump, and a moveable valve member associated with the at least one duct. The moveable valve member is in use moveable relative to the main body from a first position, in which the valve member closes off the at least one duct, to a second operative position in which hydraulic fluid is permitted to flow though the at least one duct. The control valve further includes an integral set of contacts comprising first and second contact elements which are arranged in use and when the valve member is in the second position to activate the electrical pump to provide a supply of pressurised hydraulic fluid to the duct.

The integral mounting of the electrical contacts within and in conjunction with the control valve, provides in a simple and convenient manner for the automatic activation of the pump within a hydraulically powered seat adjustment system. Consequently the pump is only activated when the control valve is operated and when required. This arrangement also simplifies the pump control and wiring required and associated with conventional arrangements. It will be appreciated that generally and for most of the time the seat is in a fixed position and so the pump and pressurised fluid is generally not required. The pump is therefore generally not activated, and is only activated when the seat is to be adjusted and the control valve moved.

Preferably the moveable member is slidably mounted with respect to the main body so as to be in use slidable from the first to second position.

Preferably the first contact element comprises a pair of separated contact elements which are electrically connected together by the second contact element. The first contact element may be mounted on the moveable valve member and the second contact element is mounted on the main body.

Such an arrangement is simple and provides direct operation of the contacts. Furthermore since the second contact simply connects the contact element of the first contact no external wiring is required to or from the second contact on the moveable member.

In a preferred arrangement the contact elements are arranged to deactivate the pump when the valve member is moved from the second operative position and prior to the valve member closing off the at least one duct.

As a result operating loads on the moveable valve member (due to the pressurised fluid in the ducts) as the valve member is moved to close off the ducts are reduced. This reduces wear and allows for a simpler operating arrangement for the control valve to be used.

The control valve may also include a biassing spring arranged to bias the moveable member towards the first position. This ensures that the valve is normally closed and so the seat position fixed and the pump deactivated.

The at least one duct may comprise a first duct and second duct which are arranged in use in the second operative position of the moveable member to be interconnected to permit fluid flow between the first and second ducts. The moveable valve member may include at least one recess defined within the moveable valve member. This recess is arranged, in use when the moveable member is in the second operative position to interconnect the first duct with the second duct.

The recess within the movable member provides in a simple manner an interconnection and flow passage between the first and second ducts which when moved can then also close off the ducts.

Preferably the at least one duct further comprises a third duct, and the moveable member is moveable to a third operative position in which the first and third ducts are interconnected and hydraulic fluid is permitted to flow between the first and third ducts. The control valve also further includes a second set of electrical contacts which are arranged in use and when the valve member is in the third operative position to activate the pump to provide a supply of pressurised hydraulic fluid to the valve. The moveable valve member further includes two recesses defined within the moveable valve member. The first recess is arranged in use when the moveable valve member is in the second operative position to interconnect the first and second ducts. The second recess is arranged in use when in the moveable valve member is in the third operative position to interconnect the first and third ducts.

This provides a double acting control valve in which the pump is automatically operated to deliver pressurised hydraulic fluid selectively via the control valve to different ducts and so to different hydraulic lines of the seat adjustment system and provide different operation (e.g. extension or retraction of an actuator).

The ducts and movable closure member may be further adapted to in use when in the second operative position permit hydraulic fluid to flow through the third duct, and in the third operative position permit hydraulic fluid to flow through the second duct. By this arrangement the second and third ducts can be used within a hydraulic seat adjustment system as combined supply/return ducts connected to hydraulic lines to a seat actuator. The single control valve of this configuration can then be used to control both the supply to and flow from an actuator with control valve directing the flow of hydraulic fluid through the ducts in opposite senses depending upon the operative position of the control valve. Such combined supply/return ducts simplifies the overall pipework of the system and the control arrangement requires only one control valve (for each adjustment) which simultaneously controls in a coordinated manner the flow both to and from an actuator.

In a further aspect of an embodiment of the invention there is provided a control module for a hydraulically powered vehicle seat adjustment system.

The control module comprises a housing which defines an internal chamber, and at least one control valve for controlling a flow of hydraulic fluid in the hydraulically powered vehicle seat adjustment system. The internal chamber comprises a hydraulic fluid reservoir of the hydraulically powered vehicle seat adjustment system, and the at least one control valve is disposed within the internal chamber.

By locating the control valve within the reservoir of the hydraulic seat adjustment system any leakage from the control valve is self contained within the hydraulic system.

The control valves are also protected from damage by being located within the housing. This arrangement also provides an integrated and combined arrangement is also provided which can be more easily mounted to the seat as a single unit rather than as separate components, which simplifies assembly.

The at least one control valve preferably also includes a conduit defined within the control valve and which is interconnected with the internal chamber. This provides a simple return path to the reservoir in the hydraulic seat adjustment system without the need for additional separate pipework.

The control module further preferably includes at least one user operable switch mounted upon the housing and arranged to operate the at least one control valve. The control module is preferably adapted to be mounted upon a side valence of a vehicle seat.

This combined integration of switches, reservoir, control valves and electronic control unit all mounted on the side valence simplifies the overall arrangement into a single unit which can be simply mounted on the seat where it can be directly operated by a seat occupant. This simplifies assembly and also reduces the external wiring and pipework required.

Other advantageous features, advantages and aspects of the invention will also be apparent to those skilled in the art form the following more detailed description.

BRIEF DESCRIPTION OF THE DRAWINGS

FIG. 5 is an end cross sectional view through the control valve shown in FIG. 3 on section X—X.

DETAILED DESCRIPTION OF THE INVENTION

Figure 1:
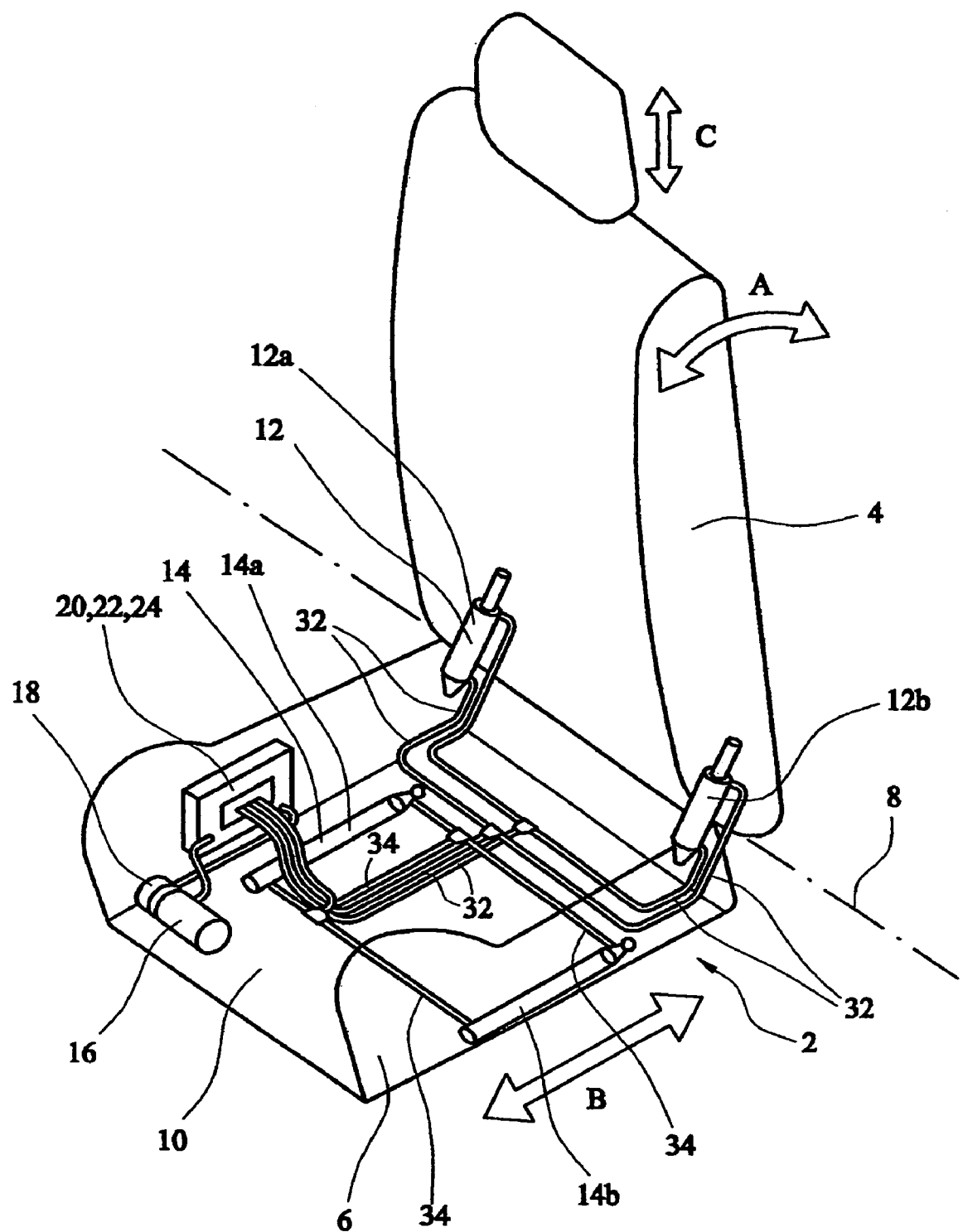
FIG. 1 is a schematic perspective illustration showing the general disposition of a hydraulic vehicle adjustment system in accordance with an embodiment of the invention within a vehicle seat.

Referring to FIG. 1 there is shown a schematic illustration of the disposition of a hydraulically powered seat adjustment system 10 within an outline of an automotive vehicle seat 2. The vehicle seat 2 includes a seat back 4 which is pivotally connected to a bottom seat cushion 6, in a conventional manner, at one end about a horizontal lateral axis 8 such that the angle of the seat back 4 can be adjusted relative to the generally horizontally disposed seat bottom cushion 6 as indicated by arrow A. The seat bottom cushion 6 is also slidably mounted to the vehicle floor (not shown) in a conventional manner, for example using a pair of sliding seat tracks or rail assemblies (not shown), to allow the seat cushion 6 and seat 2 to be slid fore and aft as indicated by arrow B. The fore and aft position of the seat 2, and angle of the seat back 4, are adjusted and secured in position by a powered hydraulic adjustment system 10 operated by a seat occupant.

Figure 2:
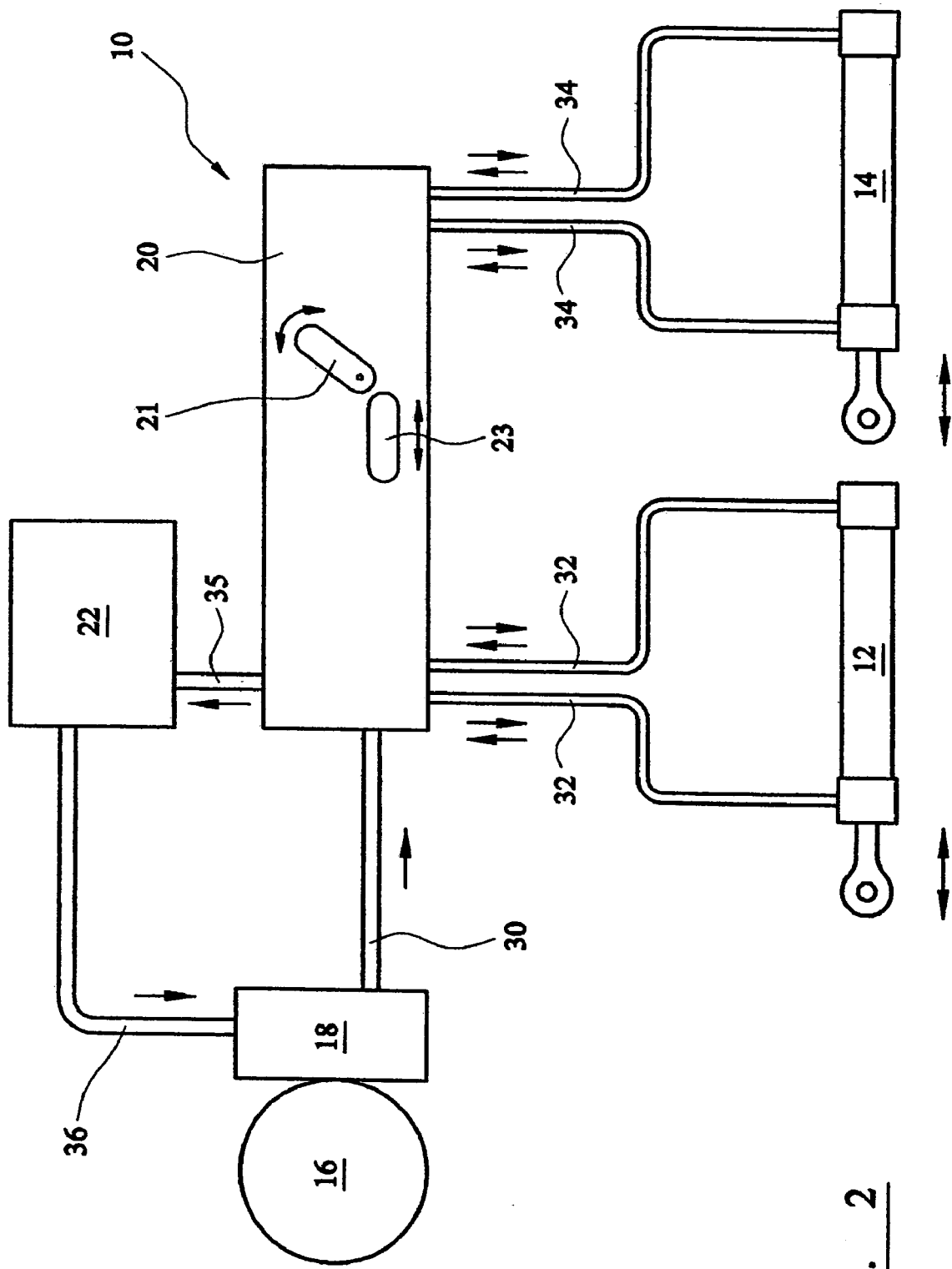
FIG. 2 is a schematic simplified illustration of the the hydraulic vehicle adjustment system of FIG. 1.

The hydraulic adjustment system 10, and the hydraulic circuit, is more clearly in simplified schematic form in FIG. 2. The hydraulic adjustment system 10 comprises a hydraulic pump 18 driven by an electric motor 16 preferably mounted on, and underneath the seat 2. Alternatively the pump 18 and motor 16 may be mounted remotely from the seat 2 and connected to the seat 2 via pipework and electrical cables. The pump 18 is connected to and in fluid communication with a control module 20. The pump 18 supplies pressurised hydraulic fluid via a supply pipe 30 to the control module 20. The control module 20 includes control valves 40 which selectively in use direct and control a flow pressurised fluid supplied from the control module 20 to a number of hydraulic actuators 12,14 via actuator supply/return pipes 32,34. Supply/return pipes 32,34 also return the hydraulic fluid from the hydraulic actuators 12,14 via the control module 20, and the control valves 40, to a reservoir 22 which stores an operating quantity of hydraulic fluid. The hydraulic fluid is supplied from the reservoir 22 to the pump 18 via a pump feed pipe 36.

The system preferably operates at a relatively low hydraulic pressure, typically 20 bar, which is considerably lower than typical hydraulic systems. At such a low operating pressure the hydraulic pipes 30,32,34,35,36, pump 18 and valves can be of relatively lightweight construction and sealing problems and leakages are reduced. This reduces the complexity of the system 10 and so costs.

The hydraulic actuators 12,14 are arranged to set and drivingly adjust the various powered seat adjustments of the seat 2. In this embodiment the actuators 12,14 comprise seat pivot actuators 12 to adjust and set the seat back 4 angle, and seat track actuators 14 to adjust and set the seat 2 fore & aft position. Whilst in FIG. 2 only a single representative actuator 12,14 is shown for each seat adjustment, as shown in FIG. 1, the hydraulic seat pivot actuator 12 comprises a pair of hydraulic seat pivot actuators 12a,b at either lateral side of the seat 2. These actuators 12a,12b are connected between the seat bottom cushion 6 and seat back 4 respectively at positions spaced from the pivot axis 8. The pair of hydraulic seat pivot actuators 12a,b are hydraulically connected together in parallel, with the hydraulic supply/return pipes 32 from the control module 20 to the actuators 12a,12b splitting and branching off to each actuator 12a,12b as illustrated in FIG. 1. The pivot actuators 12a,b comprise hydraulic piston and cylinders which extend-retract in response to a flow of pressurised hydraulic fluid supplied to the pivot actuators. Extension and retraction of the pivot actuators 12 pivots and adjusts the angle the seat back 4 relative to the seat cushion 6 with the pivot actuators 12 setting and adjusting the seat back 4 position and angle relative to the seat cushion 6.

Similarly the seat track actuators 14 comprise a pair of seat track actuators 14a,b associated with the seat track assemblies and located at either lateral side of the seat 2. The seat track actuator 14a,b are connected between the seat cushion 6 and the vehicle floor, or respective sliding parts of the seat track or rail assemblies. The actuators 14a,b comprise hydraulic piston and cylinders which extend-retract in response to a flow of pressurised hydraulic fluid supplied to the track actuators 14a,b. Extension and retraction of the actuators 14 adjusts and sets the fore and aft position of the seat cushion 6 relative to the vehicle floor.

It will be appreciated that the seat 2 may be mounted to provide for other movement for example adjust the height of the vehicle seat 2, and/or angle and tilt of the seat bottom cushion 6. The seat 2 may also include further movable portions for example a movable headrest, and/or the lumber support. Further pairs of actuators, or single actuators, may accordingly be similarly provided for such further adjustable mountings and/or movable portions. Such further actuators are further similarly connected to the control module 20 and further control valves therein in a similar manner to the seat track actuators 14 and seat pivot actuators 12.

In general for structural adjustments where the adjustment mechanism may be subject to high crash loading and where there are regulatory crash test requirement to maintain the correct position, for example seat back 4 position or seat 2 fore-aft position, pairs of actuators 12,14 are used to provide structural integrity. For, so called, comfort adjustments for example lumber or headrest position a single actuator may be used.

Figure 4:
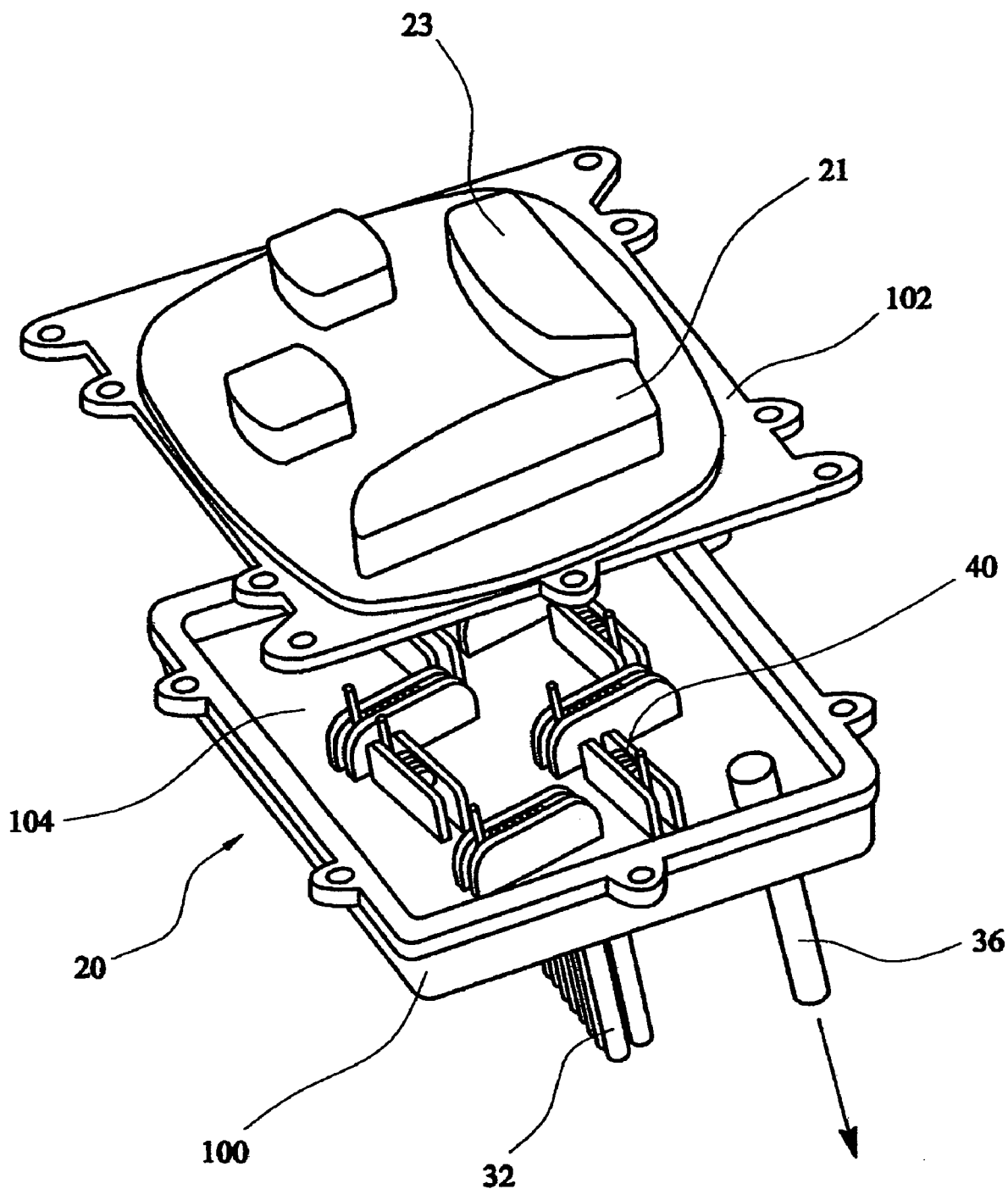
FIG. 4 is a schematic illustrative perspective exploded view of the integrated control assembly, shown in FIG. 1 and including a number of the control valves shown in FIG. 3, in accordance with an embodiment of the present invention.

Switches 42, operable by the seat occupant operate the control valves 40 within the control module 20 to adjust the seat 2 position and seat adjustments as required. As shown in FIGS. 2 and 4 the switches 21,23 may be representative of the vehicle seat 2. Preferably the seat back 4 switch 21 is pivotal, and the seat fore and aft switch 23 is slidable fore and aft, such that movement of the switch 21,23 corresponds to the resultant seat adjustment. The control module 20 is preferably in accordance with an aspect of the invention mounted on a side valance of the seat 2 within reach of the seat occupant, with the switches 21,23 comprising part of the control module 20 and directly (or via suitable linkages) operating the valves 40 housed within the control module 20.

The control module 20 and control valves 40 are shown in more detail in FIGS. 3 and 4 and will be described in further detail below.

The control module 20 includes a number of control valves 40 to selectively direct pressurised fluid supplied to the control module 20 from supply pipe 30 to respective supply/return pipes 32,34 for the actuators 12,14, and to correspondingly connect the respective corresponding return/supply pipes 32,34 from the actuators 12,14 to allow fluid displaced from the actuators 12,14, by their operation, to be returned to the reservoir 22 via a return pipe 35. In operation the pressurised fluid may accordingly be selectively supplied to each actuator 12,14 via either supply/return pipe 32,34 and returned via the corresponding other supply feed pipe 32, 34 in opposite flow directions to operate and move the actuator 12,14 in either opposite respective direction. The respective control valves 40 within the control module 20 being operated in unison by operator switches 21,23 operated by a seat occupant to move the seat 2 or parts of the seat 2 as required.

Figure 3:
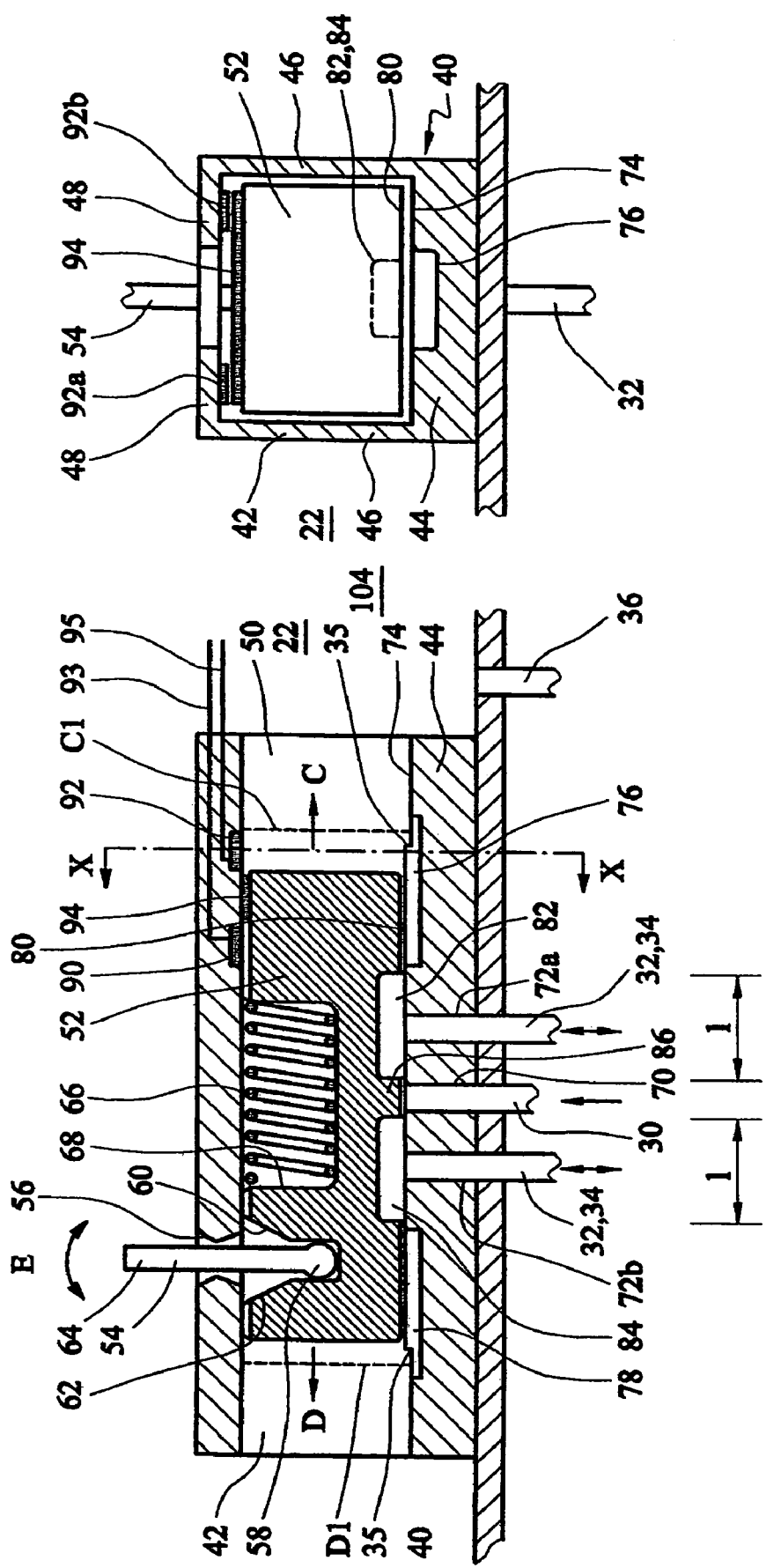
FIG. 3 is a schematic cross sectional view through a control valve of the hydraulic vehicle adjustment system, in accordance with an embodiment of the invention.

One of the control valves 40 is shown in more detail in cross section in FIGS. 3 and 5. The control valve 40 comprises a main body 42 comprising a base portion 44 from which project a pair of laterally spaced apart parallel upstanding side members 46 with oppositely inwardly directed end flanges 48 along their distal edges. The end flanges 48 are generally parallel to base portion 44, and in conjunction with the base portion 44 and side members 46 define a rectangular cross section channel 50 within the main body 42.

A valve member 52 having a rectangular cross section generally corresponding to that of the channel 50 is slidably, and moveably, located within the channel 50 and main body 42 of the control valve 40 so as to be slidable longitudinally along and within the channel 50. The valve member 52 is slid within the channel 50 by a lever 54. The lever 54 projects through, and is pivotally mounted within a profiled aperture 56 defined in the end flanges 48 of the main body 40 with the lever 54 pivoting as shown by arrow E about a mid point and an edge of the aperture 56. An end 58 of the lever 54 is located and engaged within recess 60 defined in the valve member 52. The recess 60 has a tapered profile with a wider opening portion and the end 58 of the lever 54 is engaged within the recess 60 such that it also pivots relative to the valve member 52 about the end 58 of lever engaged in the recess 60. The opposite end 64 of the lever 54 is connected either directly (as in this embodiment) to the respective user switch 21,23. Alternatively the end 64 of the lever 54 may be connected indirectly via a suitable linkage to the respective user switch 21,23. Pivotal movement of the lever 54 by movement of the user switch 21,23 as indicated by arow E thereby slides the valve member 52 along the channel 50 as indicated by arrows C and D. The maximum longitudinal position of the ends of the valve member 52 when fully slid in either longitudinal direction is indicated by dotted lines D1 and C1. A biassing spring 66 is located within a corresponding recess 58 in the valve member 52 and acts between the valve member 52 and main body 42, with a projection (not shown) from the main body 42 engaging the biassing spring 66, to bias the valve member 52 into a central, or neutral, position longitudinally within the channel 50 as shown in FIG. 3. The pivoting of the lever 54 in use overcomes the biassing force and moves the valve member 52 in respective directions (as shown in FIG. 3 left or right) longitudinally along and within the channel 50.

Three ports or ducts comprising a centre port 70 a left port 70b and a right port 70a, for conducting hydraulic fluid supplied to and from the valve 40, are defined within the main body 40, and specifically within the base portion 44.

The ends of these ports 70,72a,72b are spaced apart longitudinally in line along the centre of the channel 50 in a base surface 74 of the base portion 44 of the channel 50, and open out onto the channel 50 and central portion of the valve member 52 when in the neutral position. Also defined in the base surface 74 of the base portion 44 are base recesses or grooves 76,78 similarly in line with the ports 70,72a,72b in the centre of the channel 50 but adjacent and towards respective longitudinal end portions of the valve member 52. The recesses 76,78 extend respectively beyond the maximum longitudinal position C1,D1 of the ends of the valve member 52, and are spaced longitudinally from the respective left and right ports 72a,72b. A sealing lower surface 80 of the valve member 52 abuts against the base surface 74 of the base portion 44. First and second fluid passage recesses 82,84 are defined in the sealing surface 80 facing and adjacent the left and right ports 72b,72a with a centre land portion 86 between and separating the first and second fluid passage recesses 82, 84. The first fluid passage 82 and second fluid passage recess 84 extend longitudinally along the sealing surface 80 a distance 1 greater than the longitudinal spacing between the ports 70,72a,72b and ports 70,72a,72b and recesses 76,78.

With the valve member 52 in the neutral or null position (as shown in FIG. 3) the valve member 52, and abutment of the sealing surface 80 with the base surface 74, closes off the three ports 70,70a,70b. Specifically the centre land portion 86 closes off the centre port 70. The first and second recess 82,84, which are generally centred on the left and right ports 72a and 72b and are themselves closed off by the base surface 74 of the base portion 44 close off the left and right ports 72a,72b. When however the valve member 52 is moved to, for example, the left as indicated by arrow D the first fluid passage recess 82 is moved longitudinally to a position where it interconnects the centre port 70 with the right port 70a allowing hydraulic fluid flow between the centre 70 and right ports 70b. Similarly the second fluid passage recess 84 interconnects the left port 72b with the base recess 78. This, since the base recess 78 extends beyond the end of the valve member 52 even when moved to the left allows hydraulic fluid flow between the left port 72b and the channel 50 and outside of the valve body 42. Movement of the valve member 52 to the right, as shown by arrow C interconnects the left part 72b with the centre port 70, and the right port 72a with the channel 50.

In this embodiment, and within the hydraulic system 10 and circuit shown in FIGS. 1 and 2, the supply pipe 30 from the pump 18 is connected to the centre port 70 of the control valves 40 (via a suitable manifold arrangement to connect to multiple control valves 40). The left and right ports 72a,72b of respective control valves 40 connect to the respective supply/return pipes 32,34 to and for the respective adjustment actuators 12,14. The movement of the valve member 52 thereby connects the supply 30 to a respective supply/return pipe 32,34 to supply pressurised hydraulic fluid from the pump 18 to the actuator 12,14 with the other supply/return pipe 32,34 from the actuator 12,14 connecting through the base recesses 76,78 in the control valve 40 to allow hydraulic fluid to flow from the actuator 12,14, and as will be explained further below back the reservoir 22. Accordingly a single control valve 40 simultaneously controls both the flow of hydraulic fluid to and from the respective actuators(s) 12,14 and seat adjustments, with a separate control valve 40 being provided for each respective seat adjustment and set of actuators 12,14. In this embodiment there are two such control valves 40, one for the fore and aft actuators 14 and the other of the seat pivot actuators 12.

The control valve 40 further includes two sets of electrical contacts 90,92. Each set of contacts 90,92 is arranged to be connected and complete an electrical circuit to activate the electrical pump/motor 18/16 to supply pressurised hydraulic fluid to the control valve 40 when the valve member 52 is moved to its left or right activated operating positions respectively. The first set of contacts 90 are connected when the valve member 52 is in the left position, and the second set of contacts 92 are connected when the valve member 52 is in the right position. As shown in FIGS. 3 and 5, the respective sets of contacts 90,92 are correspondingly longitudinally spaced apart on the underside of the end flanges 48 of the main body 40. Each set of contacts 90,92 each comprise separate contact elements (shown as 92a, and 92b in FIG. 5) mounted on the underside of each end flange 48 and laterally spaced apart from each other. Suitable wiring 93,95 connects the separate contact elements and contacts 90,92 to an electrical circuit (not shown) controlling the electrical pump 18 and supplying power to the motor 16/pump 18. The valve member 52 includes a further connector contact 94 mounted on the valve member 52 and extending laterally across the valve member 52. This connector contact 94 is arranged to abut against the separate electrical contact elements 92a,92b of the set of contact 90,92 and electrically connects the respective set of contact elements 92a,92b of the set of contacts 90,92 to complete the electrical circuit when the valve member 52 is moved to the left or right position.

The contacts 90,92 are integral with and built into the control valve and are directly activated and operated by movement of the valve member 52. The wiring to the contacts 90,92 from the pump circuit in this arrangement is also provided to and from the fixed stationary valve body 42. Preferably such wiring is provided integrally and within the main body 42 with a simple electrical connection (not shown) to and from the main body.

This arrangement of electrical contacts 90,92, integral with the control valve 40, provides for automatic activation of the pump 18 to supply pressurised hydraulic fluid to the control valve 40 when the control valve 40 (and valve member 52 thereof) is moved to an operating position. This automatic activation using an integral set of contacts 90,92 is much simpler than other arrangements and/or providing a separate switch means. The switching on and activation of the pump 18 only when the control valve 40 is operated also means that the pump 18 only operates when needed, rather than operating all the time and maintaining a supply of pressurised fluid within the supply pipe 30. This is more efficient and also means that during most of the time the hydraulic lines 30,36,35 are not pressurised so reducing the risk of leaks and continual load on the connectors and hydraulic pipework. Furthermore by careful placing of the sets of electrical contacts 90,92 it can be arranged that during most of the movement of the valve member 52 the sets of contacts 90,92 are not connected and the pump 18 is not operating to supply pressurised fluid to the ports 70. Accordingly whilst the valve member 52 is being moved there is no (or reduced) pressurised fluid supplied to the ports 70 to act upon the valve member 52 in particular when the valve member 52 closes off the ports 70,72a,72b. This reduces frictional forces during movement of the valve member 52 so reducing operating loads and wear.

The control module 20 comprises two housing members 100,102 which are fastened and sealed together to define an internal chamber 104. The control valves 40, one for each seat adjustment and set of actuators 12,14, are mounted within the internal chamber 104 of control module 20 and from one of the housing members 102. The respective ports 70,72a,72b of the control valves 40 connect through the housing 102 to respective hydraulic pipework to the pump 18 and actuators 12,14. The user switches 21,13 are moveably mounted upon the one of the housing members 102,104 and are connected to the respective ends 64 of the levers 54 of the control valves 40 to move and operate the control valves 40.

The internal chamber 104 of the control module 20 defines and provides the reservoir 22 with the pump feed pipe 36 connecting to the internal chamber 104 of the control module 20 to supply hydraulic fluid to the pump 18. Hydraulic fluid flowing from the control valve ports 72a,72b from the supply/return pipes 32,34 from the actuators 12,14 and through the base recess 78,76 into the channels 50 of the control valves 40 flows directly into the internal chamber 104 and to the reservoir 22. The base recesses 78,76 thereby comprise and provide the return connection 35 between the control valves 40 and reservoir 22.

This arrangement of the control valves 40 within an internal chamber 104 comprising the reservoir 22, and configuration of the control valves 40, simplifies the overall arrangement and minimises the hydraulic pipework required. Furthermore since the control valves 40 are completely located within the reservoir 22, and so completely contained within the hydraulic circuit of the hydraulic system 10, any leakage of hydraulic fluid from control valve 40 and between the moving parts of the control valve 40 is contained within the control module 20 and reservoir 22 and within the hydraulic circuit 10. It will be appreciated that leaks are most frequent from the moving parts of any hydraulic circuit and in particular from the control valves 40. As well as minimising external leakage, this also means that the manufacturing tolerances for the control valves 40 do no need to be as precise as conventionally required.

The integration of the reservoir 22, control valves 40 and switches 21,23 within a single integrated control unit 20, also greatly simplifies the overall arrangement and the electrical and hydraulic connections extending around the seat 2. The control module 20 can also be readily preassembled and then fitted as a single unit 20 to the side valence of the seat 2 simplifying production line assembly. The pump 18 and electric motor 16 could also be further integrated into the control module 20 to further simplify the arrangement, although separate location of the pump 18 may be desirable due to space constraints at the side of the seat 2 where the switches 21,23 can be readily operated by a seat occupant. In addition remote location of the motor 16 and pump 18 may reduce the nosie and allow better noise attenuation to be provided. It will be appreciated that this integration into a single control module 20 is an important further aspect of this invention.

It will also be appreciated that in the simplified hydraulic system 10 shown in FIGS. 1 and 2 there are only two seat adjustments and so only two control valves 40 are needed. In FIG. 4 many more control valves 40 are shown, for illustrative purposes, for other seat adjustments and are similarly connected and control further actuators and operated by further user switches.

In operation to adjust for example the angle of, and recline, the seat back 4 a seat occupant presses or moves the respective switch 21 on the control module 20 on the side valance of the seat 2. This operates the respective control valve 40 within the control module 20 to interconnect and direct hydraulic fluid from the supply pipe 30 to one of the supply/return pipes 32 connected to the seat pivot actuator 12, and to interconnect and direct hydraulic fluid from the other of the supply/return pipe 32 from the seat pivot actuator 12 to the return pipe 35/reservoir 22. At the same time movement of the switch 21 and control valve 40 automatically closes the respective set of electrical contacts 90,92 and activates the motor 16 and pump 18 to generate a flow of pressurised hydraulic fluid which is supplied and directed to the seat pivot actuator 12 causing the actuator 12 to extend and recline the seat back 4. Once the desired reclined position is achieved the occupant releases the switch 21, which closes the valves 40 which stops the pump 18. The closed valve 40, biassed to the neutral of null position, prevents flow of fluid from the supply/return pipes 32 thereby preventing further movement of the seat pivot actuator 12 and so securing the seat back 4 in the desired position.

To move the seat back 4 to a more upright position the switch 21 is moved in the opposite sense which operates the valve to direct and interconnect the supply/feed pipes 32 to the supply 30 in the opposite manner such that the pivot actuator 12 retracts moving the seat back 4 to a more upright position.

In the above described arrangement a single control valve 40 is advantageously used to control both the flow to an actuator 12,14 and simultaneously from the actuator 12,14. This reduces the number of control valves 40 needed. It will though be appreciated that separate, although linked, control valves (one valve for the supply to the actuator and one valve for the return) of a simplified construction and with fewer ports and recesses could be used. In such an arrangement only one set of electrical contacts 90,92 is required to activate the pump 18, and either the return or supply valve may not need such electrical contacts with the pump 18 operation controlled by the operation of the other control valve. Indeed a single control valve on only either the supply or feed 32,34 to the actuator 12,14 could be used since to cause movement a complete circuit must be made. Such arrangement is though less preferred since closing and controlling both the feed to and return from the actuators 12,14 provides a more secure hydraulic locking of the actuator 12,14 position.

It will also be appreciated that a number of further detail modifications can be made to the detailed arrangement described above. In particular, for example, the base recesses 76,78 could be replaced with ports within the base plate, similar to the other ports, and connected to further pipework to direct fluid from the left and right ports 72a,72b elsewhere rather than into the channel 50. The exact configuration of the control valves 40 and ports 70,72a,72b can also be changed. Similarly the arrangement of the electrical contacts 90,92, whilst remaining integral with the control valve can also be modified.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control valve for selectively controlling a flow of pressurised hydraulic fluid from an electrically driven pump in a hydraulically powered vehicle seat adjustment system, the control valve comprising:
   a main body defining a first duct, a second duct, and a third duct for the passage of pressurised fluid delivered from the pump, and
   a moveable valve member associated with the first, second, and third ducts which in use is moveable relative to the main body from a first position to second and third operative positions, wherein the movable valve member when in the first position closes off the ducts, and when in the second operative position permits fluid flow between the first and second ducts, and when in the third operative position permits fluid flow between the first and third ducts,
   a first integral set of electrical contacts comprising first and second contact elements which are arranged in use and when the valve member is in the second position to activate the electrical pump to provide a supply of pressurised hydraulic fluid to the valve; and
   a second integral set of electrical contacts which are arranged in use and when the valve member is in the third operative position to activate the pump to provide a supply of pressurised fluid to the valve.

2. A control valve as claimed in claim 1 in which the moveable member is slidably mounted with respect to the main body so as to be in use slidable from the first to second position.

3. A control valve, as claimed in claim 1 in which the first contact element is mounted on the moveable valve member and the second contact element is mounted on the main body.

4. A control valve as claimed in claim 1 in which the first contact element comprises a pair of separated contact elements which are electrically connected together by the second contact element.

5. A control valve as claimed in claim 1 in which the contact elements are arranged to deactivate the pump when the valve member is moved from one of the second and third operative positions and prior to the valve member closing off the respective one of the second and third ducts.

6. A control valve as claimed in claim 1 further comprising a biasing spring arranged to bias the moveable member towards the first position.

7. A control valve as claimed in claim 1 in which the moveable valve member includes at least one recess defined within the moveable valve member, the recess being arranged, in use when the moveable member is in the second operative position to interconnect the first duct with the second duct.

8. A control valve as claimed in claim 1 in which the moveable valve member includes two recesses defined within the moveable valve member, the first recess arranged in use when in the moveable valve member is in the second operative position to interconnect the first and second ducts, and the second recess arranged in use when in the moveable valve member is in the third operative position to interconnect the first and third ducts.

9. A control valve as claimed in claim 1 in which the ducts and movable closure member are adapted to in use when in the second operative position permit hydraulic fluid to flow through the third duct, and in the third operative position permit hydraulic fluid to flow through the second duct.

10. A control valve as claimed in claim 1 adapted in use for controlling the flow of pressurised hydraulic fluid from an electrically driven pump to and from at least one hydraulic actuator of the powered vehicle seat adjustment system.

11. The control valve as claimed in claim 1 further including a control module for a hydraulically powered vehicle seat adjustment system, wherein the control valve is disposed in the control module.

12. A control valve as claimed in claim 1, wherein the second and third ducts are arranged to be connected to different hydraulic lines separately connected to the actuator so as to selectively deliver hydraulic fluid to the actuator.

13. A control module for a hydraulically powered vehicle seat adjustment system comprising:
   a housing which defines an internal chamber, the internal chamber comprising a hydraulic fluid reservoir of the hydraulically powered vehicle seat adjustment system; and
   at least one control valve for controlling a flow of hydraulic fluid in the hydraulically powered vehicle seat adjustment system, the at least one control valve being disposed within the internal chamber, wherein the at least one control valve includes:
   a main body within which at least one duct is defined for the passage of pressurised fluid delivered from the pump, and
   a moveable valve member associated with the at least one duct and which in use is moveable relative to the main body from a first position in which the valve member closes off the at least one duct, to a second operative position in which hydraulic fluid is permitted to flow through the at least one duct,
   wherein the at least one control valve includes an integral set of contacts comprising first and second contact elements which are arranged in use and when the valve member is in the second position to activate the electrical pump to provide a supply of pressurised hydraulic fluid to the duct.

14. A control module as claimed in claim 13 in which the at least one control valve includes a conduit defined within the control valve and which is interconnected with the internal chamber.

15. A control module as claimed in claim 13 further comprising at least one user operable switch mounted upon the housing and arranged to operate the at least one control valve.

16. A control module as claimed in claim 13 in which the control module is adapted to be mounted upon a side valence of a vehicle seat.

17. A control valve for selectively controlling a flow of pressurised hydraulic fluid from an electrically driven pump in a hydraulically powered vehicle seat adjustment system, the control valve comprising:

a main body within which at least one duct is defined for the passage of pressurised fluid delivered from the pump, and a moveable valve member associated with the at least one duct and which in use is moveable relative to the main body from a first position in which the valve member closes off the at least one duct, to a second operative position in which hydraulic fluid is permitted to flow through the at least one duct, wherein the control valve includes an integral set of contacts comprising first and second contact elements which are arranged in use and when the valve member is in the second position to activate the electrical pump to provide a supply of pressurised hydraulic fluid to the duct, wherein the first contact element is mounted on the moveable valve member and the second contact element is mounted on the main body.

18. A control module for a hydraulically powered vehicle seat adjustment system comprising:

a housing which defines an internal chamber, the internal chamber comprising a hydraulic fluid reservoir of the hydraulically powered vehicle seat adjustment system;

at least one control valve for controlling a flow of hydraulic fluid in the hydraulically powered vehicle seat adjustment system, the at least one control valve being disposed within the internal chamber; and at least one user operable switch mounted upon the housing and arranged to operate the at least one control valve.

19. A control module for a hydraulically powered vehicle seat adjustment system comprising:

a housing which defines an internal chamber, the internal chamber comprising a hydraulic fluid reservoir of the hydraulically powered vehicle seat adjustment system; and at least one control valve for controlling a flow of hydraulic fluid in the hydraulically powered vehicle seat adjustment system, the at least one control valve being disposed within the internal chamber, and wherein the control module is adapted to be mounted upon a side valence of a vehicle seat.

* * * * *